Feb. 1, 1944.   B. H. KOOB   2,340,812
APPARATUS FOR HANDLING GLASS ARTICLES
Filed Feb. 27, 1942   6 Sheets-Sheet 1

Inventor
Bernard H. Koob
by Brown & Parham
Attorneys

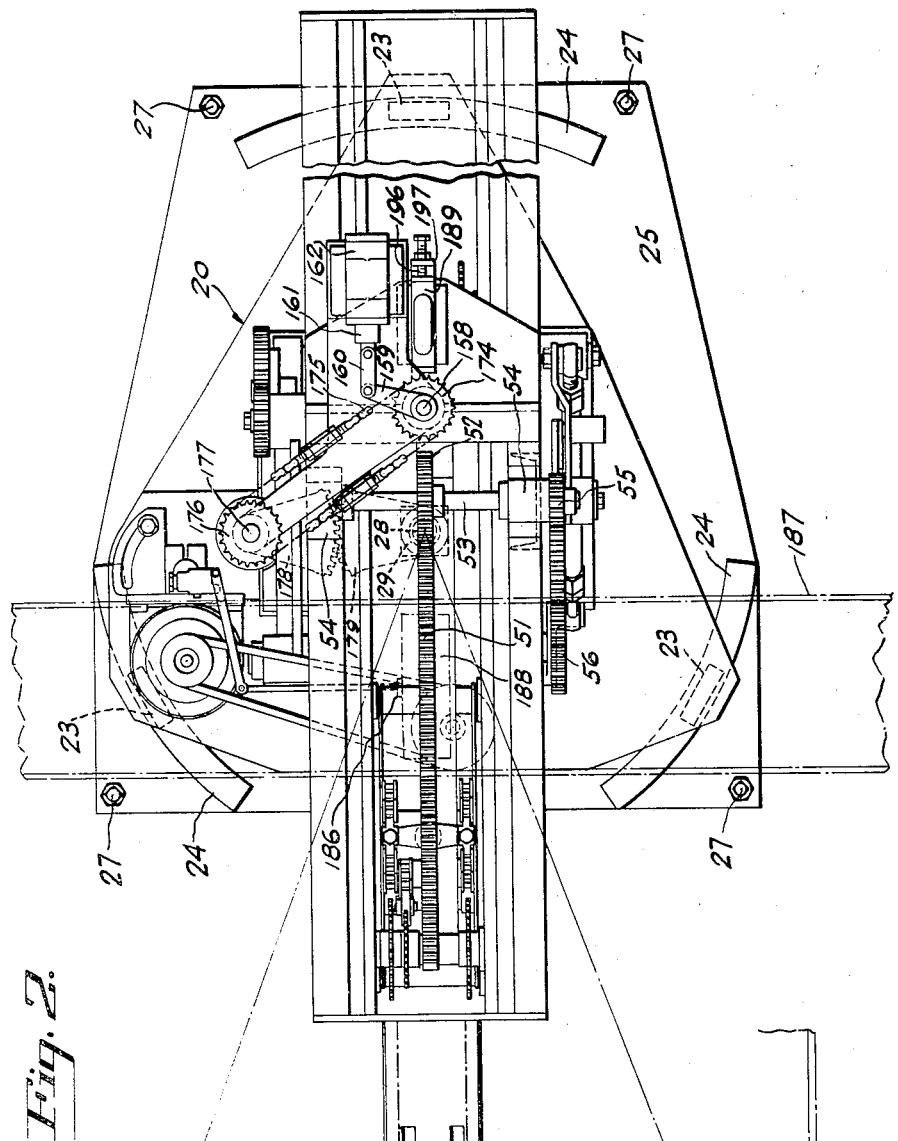
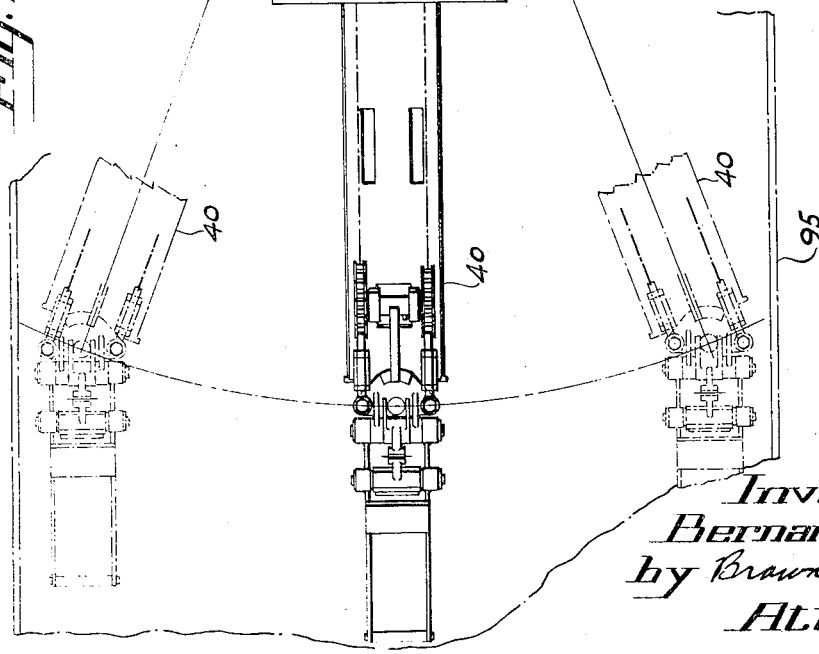
Fig. 2.

Feb. 1, 1944.  B. H. KOOB  2,340,812
APPARATUS FOR HANDLING GLASS ARTICLES
Filed Feb. 27, 1942   6 Sheets-Sheet 3

Inventor
Bernard H. Koob
by Brown & Parham
Attorneys

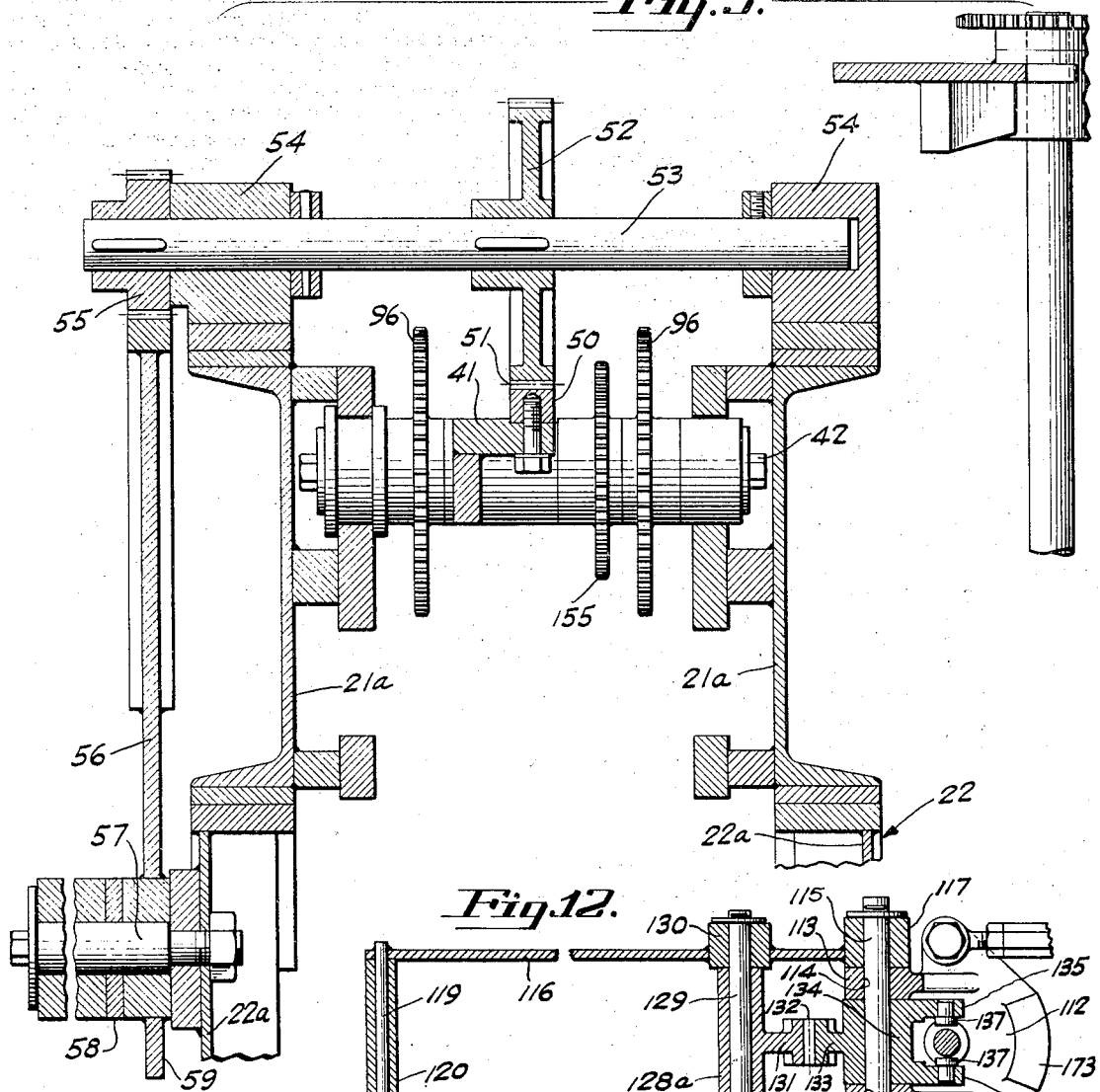
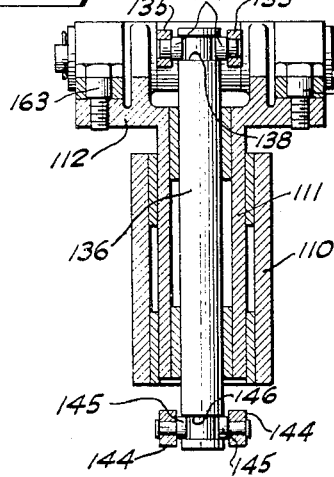
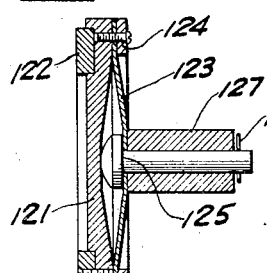
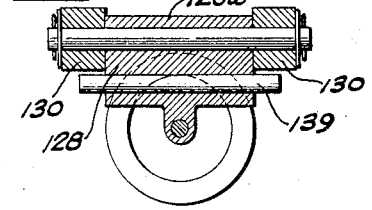

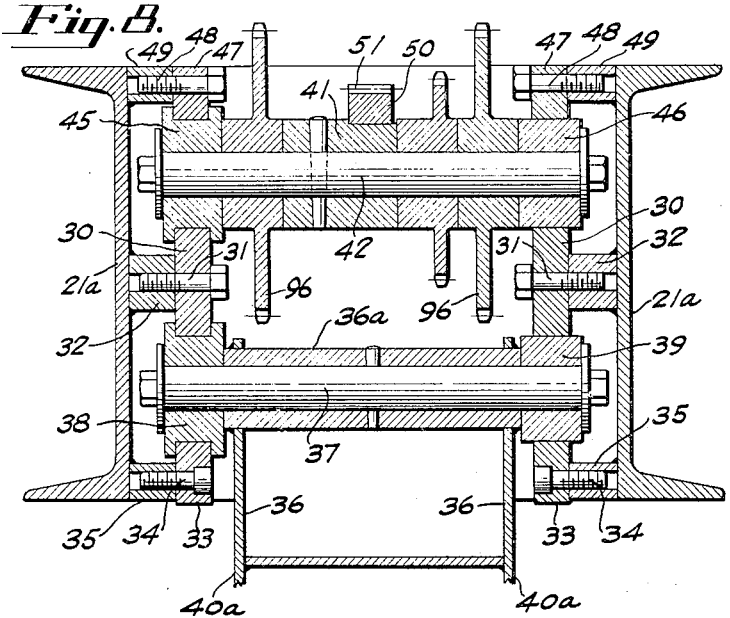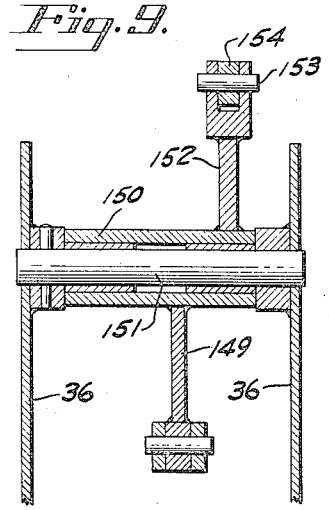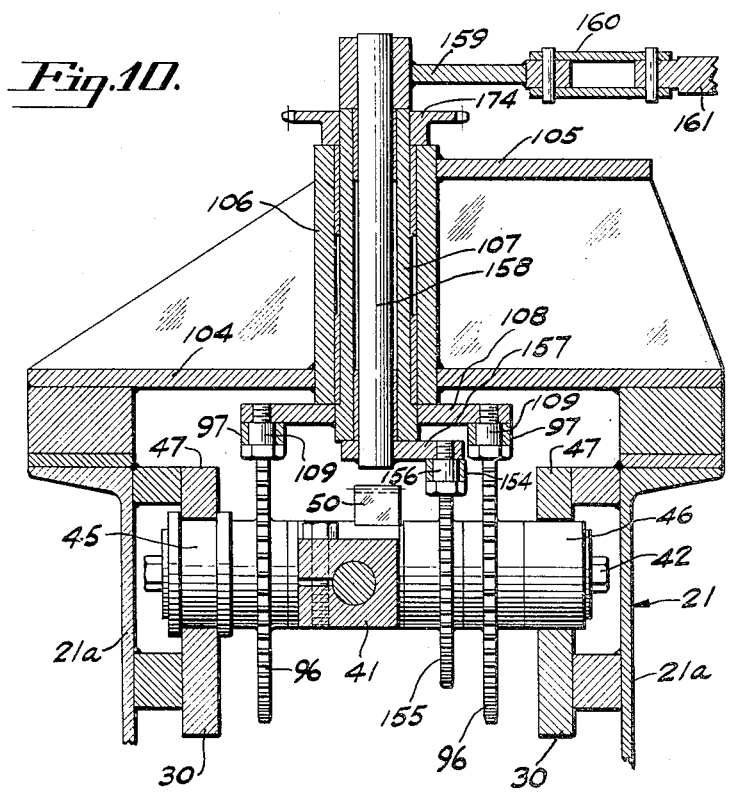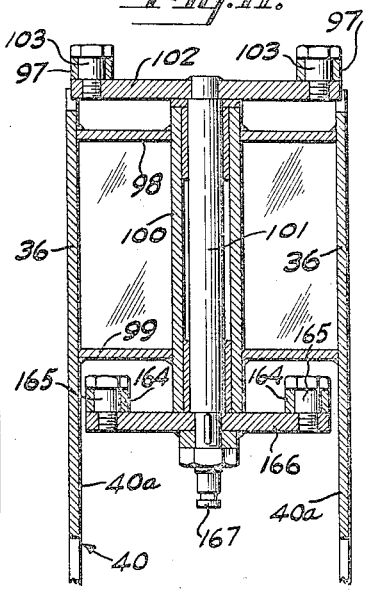

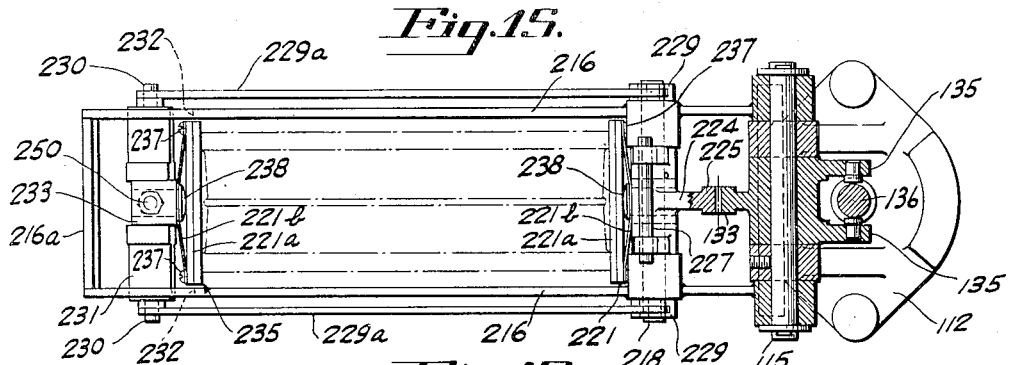
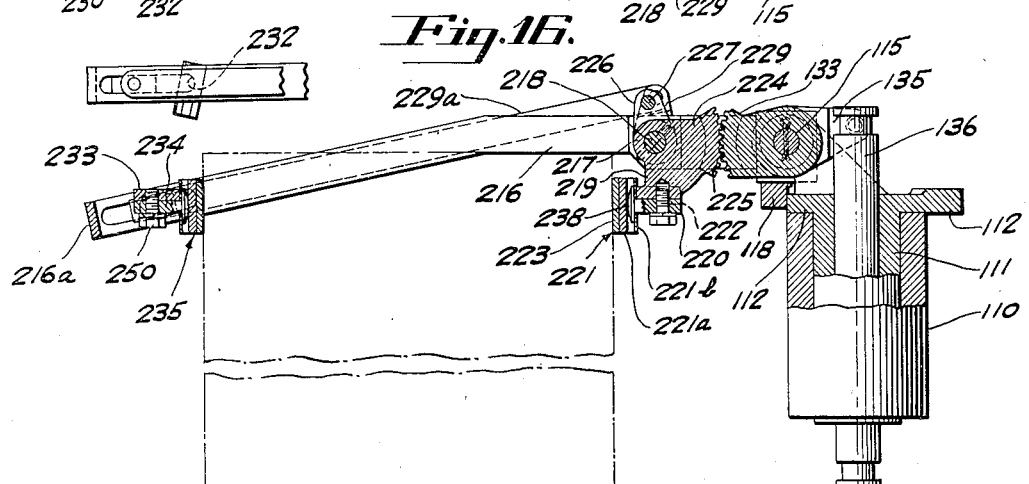
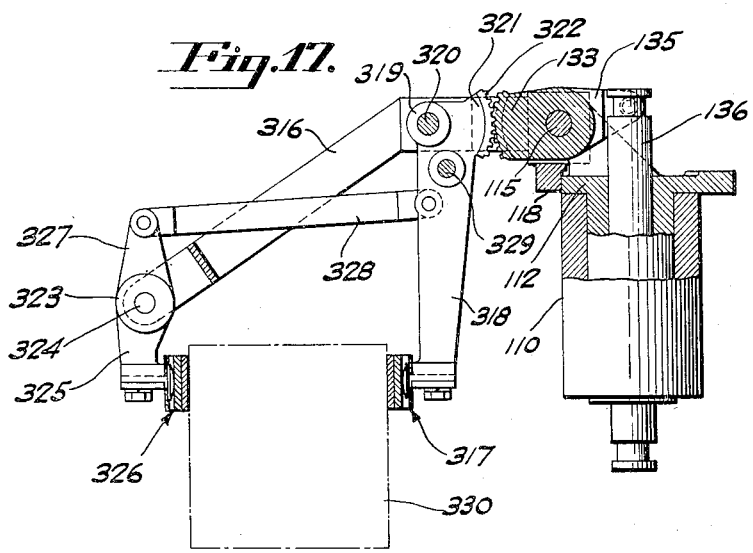

Patented Feb. 1, 1944

2,340,812

UNITED STATES PATENT OFFICE 2,340,812

APPARATUS FOR HANDLING GLASS ARTICLES

Bernard H. Koob, West Hartford, Conn., assignor to Hartford-Empire Company, Hartford, Conn., a corporation of Delaware Application February 27, 1942, Serial No. 432,617

12 Claims. (Cl. 214—1)

This invention relates to apparatus for handling articles and more particularly to a device for picking up successive glass articles at a receiving station and for depositing such articles onto a lehr conveyor so that, if desired, such articles may be distributed transversely of such conveyor so as to form a predetermined number of transversely spaced longitudinally extending rows thereon. Such a device is generally termed a "stacker."

Apparatus of the invention is well adapted to transfer glass brick, glass building blocks or other relatively heavy articles from a pick-up position to a delivery position, as to the conveyor of a lehr in which such articles are to be annealed. It of course is not limited to this use.

An object of the invention is to provide a practical automatically operating device for picking up each of a series of glass articles, such as a glass brick or building block, on arrival of each such article at a receiving station, for moving such article bodily in a generally horizontal direction for a substantial distance to a predetermined position above a portion of a lehr conveyor and for then setting such article down on the lehr conveyor at a place which may vary for successive articles in a direction extending transversely of the lehr conveyor.

A further object of the invention is to provide a glass article stacking apparatus of the character described which will be actuated by the arrival of each such article at a receiving station and thereafter will automatically perform a cycle of article transferring movements including the transfer of the article to the predetermined place on the lehr conveyor that is to be loaded with such articles and the return of the article transferring means to the receiving station, after which the stacking device will remain inactive until again actuated by the next article as it arrives at the delivery station, whereby successive cycles of article transferring movements of the stacking device may be of like duration while the periods of inactivity of the device between successive cycles thereof may be of different duration.

A further object of the invention is to provide an article stacking device having tongs for gripping and releasing each article to be transferred together with suitable means for bodily moving the tongs from the article receiving station to the article delivery station and back to the first station and for opening and closing such tongs at the proper times in this cycle of movements through the operation of mechanical connections between the tong members and a motor which is mounted separately from the tongs so that it need not be moved bodily therewith.

A further object of the invention is the provision in an article stacking device of the character described of a novel means for automatically distributing successive articles transversely across a lehr conveyor while at the same time maintaining uniformity of angular relationship of the corresponding sides of such articles to the direction of length of the lehr conveyor.

A still further object of the invention is the provision of a glass article stacking device having a transfer arm mounted and operated to oscillate horizontally about a vertical axis and to be reciprocated longitudinally thereof and also having tongs swiveled to the transfer arm at the outer end thereof and actuated automatically to swing about a vertical axis at their connection with the transfer arm oppositely to the swinging movements of the transfer arm about its vertical axis so that such tongs will remain parallel with the direction of length of a lehr conveyor onto which glass articles are to be stacked by the device while the postion of the tongs may be shifted back and forth across the conveyor by the oscillatory movements of the transfer arm so that successive articles may be delivered onto the conveyor at transversely spaced different positions thereon.

A further object of the invention is the provision of a ware stacking device having a tongs-carrying transfer arm mounted for oscillatory movements about a vertical axis and for rectilinear movements relative to that axis, together with mechanism for moving such arm constructed and arranged to convert a given rectilinear movement of an actuating member of such mechanism into a much longer rectilinear movement of the transfer arm.

Generally described, a glass article stacking device of the present invention may comprise a horizontally oscillatory main carriage. A transfer carriage may be supported on the main carriage for horizontal reciprocatory movements relative thereto and also for oscillatory movements in unison with the main carriage. The transfer carriage may carry a projecting transfer arm, movable with such carriage and provided at its outer end with tongs for gripping each article to be transferred when the tongs are at an article receiving station and for releasing such article at a delivery station. These tongs may be so constructed, mounted and operated that they will remain parallel with a given straight line, as, for example, the longitudinal median line of the lehr conveyor onto which the articles are to be stacked, while the transfer arm may be swung angularly about the axis of oscillation of the main carriage so as to distribute successive articles carried by such tongs to delivery stations which respectively are located at different places transversely of the conveyor. The structural arrangement and mode of operation are such that the tongs will be returned to the same position at the article receiving or pick-up position after all such article transferring movements thereof.

An intermediate or actuating carriage may be movably supported on the main carriage and reciprocated horizontally relative to the latter. The actuating carriage may be operatively connected with the transfer carriage so that a given reciprocatory stroke thereof relative to the main carriage will cause a reciprocatory stroke of the transfer carriage in the same direction but for a much greater distance.

The reciprocations of the actuating carriage and the oscillations of the main carriage may be effected and controlled in relation to each other to cause stacking of successive articles on a lehr belt in a selected number of transversely spaced longitudinal rows on such conveyor, all such articles having been picked up at the same article receiving or pick-up station.

The control mechanism of the device preferably is constructed and arranged to initiate a cycle of article transferring operations of the device on arrival at the pick-up station of each article to be transferred and to maintain the device inactive after completing such a cycle, pending arrival at the pick-up station of the next article to be transferred.

The tongs may be opened and closed by operating connections between the tong members and an air motor. These connections are such that the air motor may be mounted on the main supporting carriage of the device and hence need not be supported for movement with the tongs. The structure and mode of operation of a practical embodiment of the invention will be further explained and details thereof hereinafter will be pointed out with particular reference to the illustrative device shown in the accompanying drawings, in which:

Fig. 2 is a plan view of the stacking device with the transfer arm in projected position as in Fig. 1, the view also showing in dot-and-dash lines two other projected positions to which the outer end portion of the transfer arm and the tongs carried thereby may be moved in order to distribute different articles to transversely spaced portions of the lehr conveyor;

Fig. 5 is a relatively enlarged vertical section through the head or top and part of the column structure of the main carriage, substantially along the line 5—5 of Fig. 1;

Fig. 6 is a relatively enlarged vertical section substantially along the line 6—6 of Fig. 1, showing the structural arrangement for mounting the tongs head on the transfer arm of the device;

Figures 1, 7:
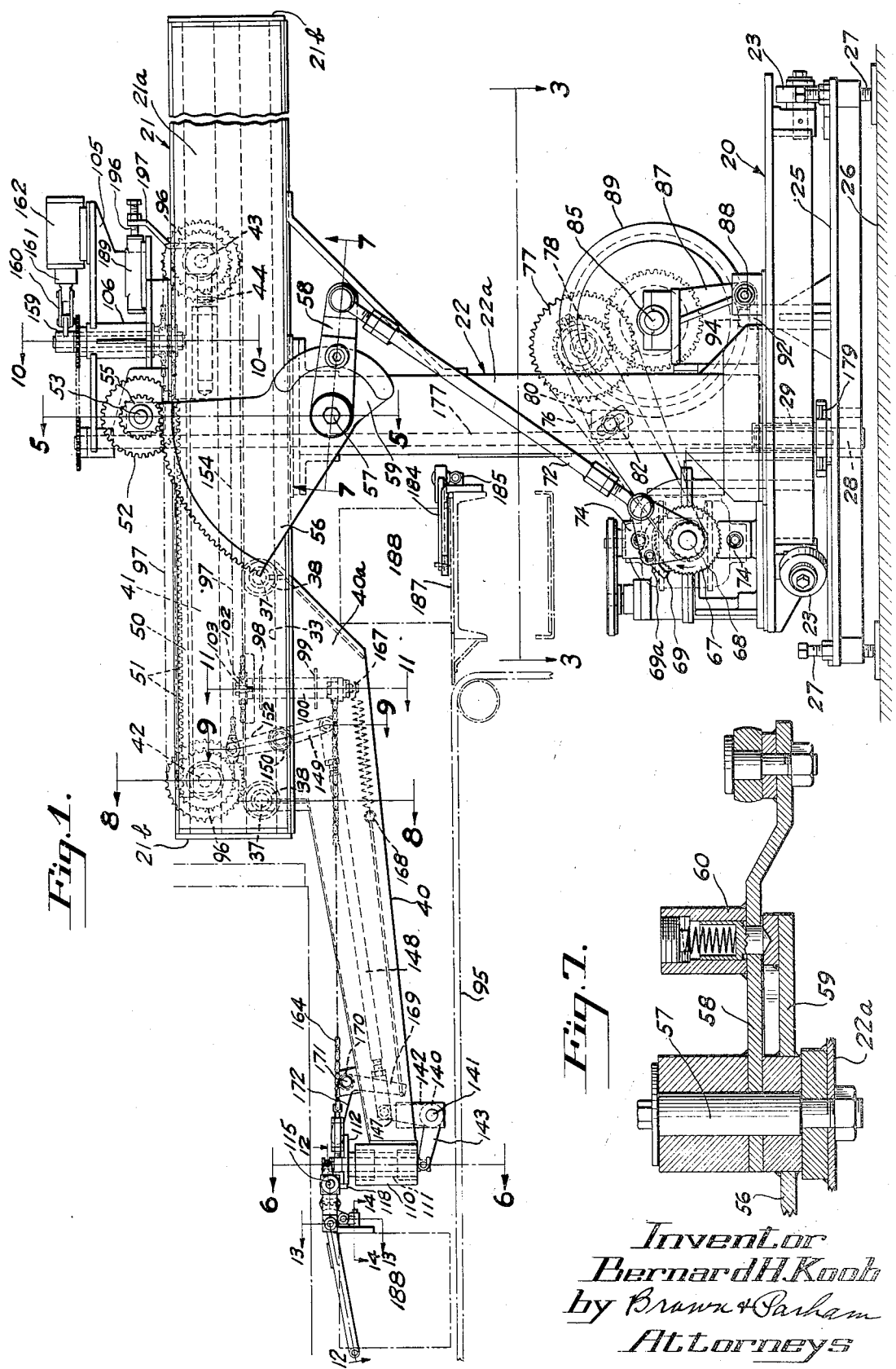
Figure 1 is a side elevation of a stacking device of the present invention, showing the transfer arm in a projected position with the tongs gripping an article at a delivery station above a lehr conveyor, the view also showing in dot-and-dash lines the position at an article receiving or pick-up station on a cross-conveyor of each article to be transferred to the lehr conveyor by the device.
Fig. 7 is a relatively enlarged section along the line 7—7 of Fig. 1, showing a safety device for operatively connecting together motion-transmitting elements of the mechanism for reciprocating the transfer arm of the device.

Figs. 8, 9, 10, 11, 12, 13 and 14 are relatively enlarged sections along the lines 8—8, 9—9, 10—10, 11—11, 12—12, 13—13 and 14—14, respectively, of Fig. 1, showing details of different components of the conveyor arm and tongs operating mechanism of the device, some of these views showing details of one form of tongs which may be included in the stacking device;

Figs. 15 and 16 respectively are a plan view and a side elevation of another form of tongs which may be substituted for the tongs of the assembly shown in the preceding views; and Fig. 17 is a view similar to Fig. 16, showing a still further form of tongs which may be used in the stacker of the present invention.

Main structural features of the device

The stacking device shown in the drawings comprises an oscillatory main carriage consisting of a base 20, a head or top 21 and a vertical head or top supporting column structure indicated at 22, all as shown in Fig. 1. The base 20 may be mounted on wheels 23 which rest upon arcuate tracks 24 on a supporting platform 25, Figs. 1, 2 and 3. The supporting platform 25 may be adjustably supported on the factory floor 26, Fig. 1, or other supporting surface, as by means of the vertical jack screws 27, Figs. 1, 2 and 3.

Figure 3:
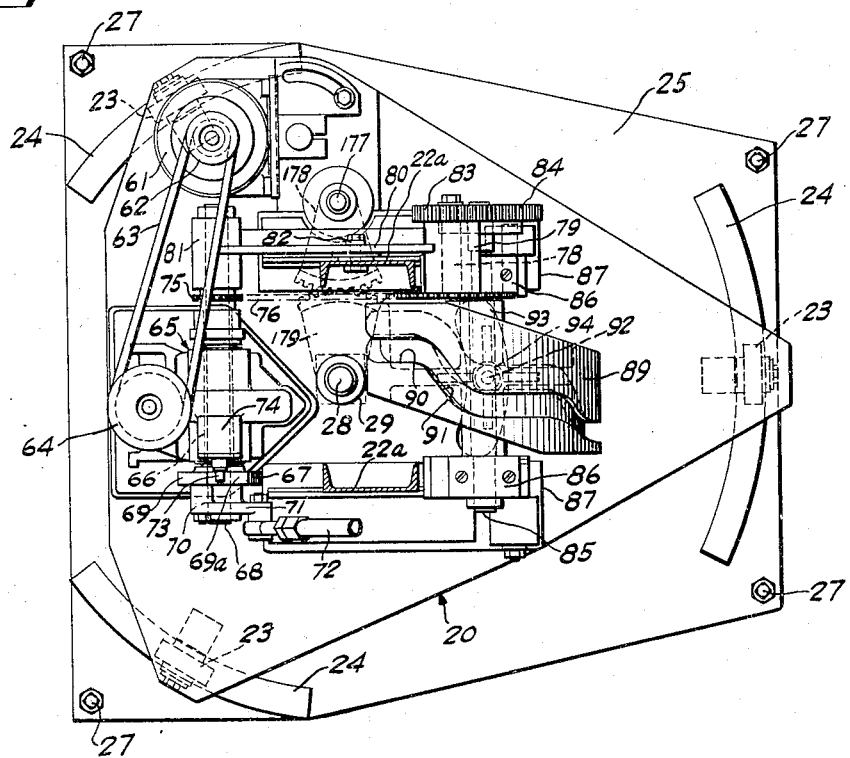
Fig. 3 is a section through the vertical stem or column structure of the oscillatory main carriage of the stacking device, substantially along the line 3—3 of Fig. 1, looking down upon the base portion of such main carriage.

A short vertical shaft 28 projects upwardly from the platform 25 and is journaled in a suitable bearing structure 29, with which the base 20 of the main carriage of the stacking device is provided, Figs. 1, 2 and 3. The main carriage thus is mounted for oscillation on the platform 25 about the axis of the shaft 28, the supporting wheels of the carriage base 23 moving on the tracks 24.

The column structure 22 of the oscillatory carriage may comprise a pair of vertically disposed channels 22a, secured at their lower ends to the base 20 and at their upper ends to horizontally spaced side members 21a of the carriage top structure 21. See Figs. 1, 3 and 5. Any suitable known means for or method of fastening these component main carriage parts securely together may be employed.

The main carriage top or head structure comprises the horizontally extending side members 21a and connecting or transversely extending end members 21b. It thus may be said to be an elongate rectangular frame that is open at its top and bottom. This frame-work carriage head structure is provided at its interior, between the side members thereof, with a longitudinally extending upper track, comprising horizontal parallel rails 30, secured to the side members 21a by cap screws 31 and inwardly extending internally screw-threaded annular bosses 32 on such side members, as best seen in Fig. 8. A lower track within the head 20 comprises a pair of longitudinally extending parallel rails 33 fastened to the side members 21a by suitable fastening means, such as the cap screws 34 and the inwardly extending annular bosses 35 on the side members 21a, as also shown in Fig. 8. The upper and lower tracks respectively support and provide runways for an actuating carriage and a transfer carriage, hereinafter to be described.

The lower, transfer carriage may comprise a pair of spaced vertically disposed side plates 36, Figs. 8 and 11. These are spanned and connected at the opposite ends of the transfer carriage by cross blocks 36a, one of which is shown to advantage in Fig. 8. Each block 36a is provided with an axial bore for the reception of an axle 37 having projecting end portions, one of which may carry a peripherally grooved wheel 38 and the other a peripherally smooth or ungrooved wheel 39 as shown in Fig. 8. These wheels ride on the rails 33 of the track for the transfer carriage. The peripherally grooved wheels 38 engage with the supporting rail 33 and with the lower portion of the overlying rail 30 so as to prevent unintended lateral displacement of the carriage.

The transfer carriage carries a transfer arm 40, which projects beyond one end of the transfer carriage as shown best in Fig. 1. The rearward end of this transfer arm may be fastened to the chassis or body of the transfer carriage in any suitable known way. As shown, this transfer arm may be made of sheet metal bent or otherwise formed to make the arm hollow and so that the side members 40a of such arm are continuous and integral with the side plates of the transfer carriage. See Figs. 8 and 11. The transfer arm 40, when it is in projected position, will project beyond one end of the head 21 of the oscillatory main carriage of the stacking device and will extend substantially in the direction of the length of such carriage head. A tongs mechanism for gripping and releasing the articles to be handled is carried at the outer end of the transfer arm 40, as hereinafter will be explained.

The upper actuating carriage is movable on the rails 30 longitudinally of the oscillatory, main carriage head 21 above the transfer carriage and is operatively connected by means to be presently described with the transfer carriage so that travel of the actuating carriage for a given distance will cause travel of the transfer carriage relative to its supporting structure in the same direction but for a much greater distance.

The actuating carriage referred to may comprise a longitudinally extending body or frame structure 41, Figs. 1, 5, 8 and 10, provided adjacent to its opposite ends with transverse axles 42 and 43, respectively, Fig. 1. One of these axles, as the axle 43, is mounted for limited adjustment longitudinally of the actuating carriage so that the distance betwen the axles of such carriage may be adjusted within limits for a purpose to be presently pointed out. The axle 43 thus may be mounted in a block which is separate from the main frame structure 41 but is fastened adjustably to the latter by any suitable known adjustable coupling means, an example of which is shown more or less diagrammatically at 44 in Fig. 1. Each axle may carry a peripherally grooved wheel 45 on one end portion thereof and another wheel 46, which may have a smooth periphery, on the opposite end portion thereof. These wheels travel on the rails 30 and are held against upward displacement from such rails by overhead longitudinally extending retaining bars 47, Fig. 8. The retaining bars 47 may be detachably connected to the side members 21a of the oscillatory carriage head structure, as by means of the cap bolts 48 and the inwardly extending internally threaded annular bosses 49 on the side members 21a.

The longitudinally extending body or frame structure 41 of the upper carriage carries a longitudinally extending rack bar 50 having transversely extending teeth 51 in its upper surface, Figs. 1, 2, 5 and 8, in mesh with the teeth of a pinion 52, Figs. 1, 2 and 5. The pinion 52 is carried by a shaft 53 which extends across the head structure 21 of the main oscillatory carriage about midway of the length of such carriage head. The shaft 53 is journaled in suitable bearings 54 on the sides of the main carriage head, as best seen in Fig. 5. A drive pinion 55 on a laterally projecting end portion of the shaft 52 is in mesh with the teeth of a sector gear 56 which is pivotally supported by a short laterally projecting shaft 57 that is carried by one of the upright members 22a of the supporting column structure of the oscillating main carriage. See Figs. 1 and 5. A crank arm 58 is pivoted on the shaft 57 and is normally locked to an integral actuating arm 59 on the sector gear plate 56 by a safety release latch mechanism indicated generally at 60 in Fig. 7. The outer end of the crank arm 58 is oscillated vertically about the axis of the horizontal shaft 57 by mechanism which will presently be described so as to oscillate the sector gear 56. The latter in turn rotates the pinion 55 and through it the shaft 53 and the pinion 52. When the latter is turned, it will act through its engagement with the rack 50 to cause longitudinal movement of the upper, actuating carriage relative to the head of the oscillatory main carriage. As aforesaid, such movement of the actuating carriage will cause a greater movement of the transfer carriage and of its supported transfer arm.

*Mechanism for reciprocating the transfer arm*

Such mechanism may comprise a motor 61, mounted on the base 20, Fig. 3, and provided with a drive pulley 62 operatively connected by a belt 63 with a driven pulley 64 of a speed reduction unit 65. The speed reduction unit has a continuously rotating sleeve or tubular driven shaft 66 to which is secured a ratchet wheel 67 which is constantly driven in one direction, as clockwise, as indicated in Fig. 1.

A shaft 68 extends through and is journaled in the sleeve in concentric relation with the ratchet wheel 67 with which it is at times operatively connected and from which it is at other times disconnected. The means for effecting this result may include a spring pressed pawl 69 which is pivotally mounted on a hub 70 by which a crank arm 71 is secured to an end portion of the shaft 68. The pawl is located substantially in the plane of the ratchet wheel 67 and is urged by its spring 69a into engagement with the teeth of the ratchet wheel so that the rotation of the latter about the axis of the shaft 68 will cause a similar rotation of the shaft 68 and of the crank arm 71. The crank arm 71 is operatively connected by a connecting rod or pitman 72 with the oscillatory arm 58. The crank arm 71 is disengaged from the ratchet wheel at each half revolution of the crank arm by the operation of a clutch mechanism which comprises a pair of upper and lower stop plungers 73 operated by the pistons of suitably located upper and lower air motors 74, Fig. 1. Each of these stop plungers, when in a projected position, will engage at an appropriate time with an inclined tail portion 69a of the pawl 69 to swing the latter about its pivotal connection with the hub of the crank arm 69 until the pawl is disengaged from the ratchet wheel. The stop plungers 73 are normally maintained in their projected positions, at which they will throw out the pawl, as by the action of springs within the stop plunger operating air motor 74. However, each may be retracted from its projected position by the pressure of air that has been supplied at the proper time to the forward end of its air motor 74. Retraction of the stop plunger will move it out of engagement with the pawl so that the latter may swing automatically back into engagement with the ratchet wheel. If deemed necessary or desirable, an overrun prevention mechanism for the shaft 68 may be provided. This may be of the structure and mode of operation which are fully disclosed in the paragraph beginning with line 45 of page 5 of the specification of the Lorenz Patent No. 1,878,156 of September 20, 1932.

The distance increasing motion-transmitting connection between the actuating carriage and the transfer carriage will now be described. Each of the axles 42 and 43 of the actuating carriage carry loosely mounted similar right and left hand sprockets 96, those on the axle 42 being shown in Figs. 5, 8 and 10. The corresponding sprockets 96 on the two axles are connected by sprocket-engaging right and left hand endless chains 97, one of such chains being indicated diagrammatically by dot-and-dash lines in Fig. 1. The distance between the axles 42 and 43 may be adjusted by the adjustable coupling means 44, Fig. 1, hereinbefore referred to, to maintain the chains 97 taut.

The lower stretches or runs of the chains 97 are connected with the transfer carriage while the upper stretches or runs are connected with the frame structure of the head 21 of the oscillatory main carriage of the device. The points of these respective connections are relatively adjacent to the front and rearward sprockets 96, respectively, on the actuating carriage when the transfer arm is in an outwardly projected article delivering position as shown in Fig. 1. The means for connecting the chains with the transfer carriage is shown best in Fig. 11 and also appears in Fig. 1. Such means may comprise a pair of horizontal upper and lower supporting plates 98 and 99, respectively, which are provided between the side plates 36 of the transfer carriage and are secured to such side plates in any suitable manner, as by welding. A vertically disposed tubular bearing 100 extends through suitable openings in the supporting plates and is secured firmly to such plates, as by welding, so that such tubular bearing is positioned intermediate the width of the transfer carriage and is rigidly connected with the latter. A vertical shaft 101 is journaled in the tubular bearing 100. A cross head 102 is mounted on the upper end of the shaft 101, being secured at its middle portion to the latter in any suitable known manner. The oppositely extending arms of the cross head carry upwardly projecting headed studs 103 which extend through links of the chains 97 so as pivotally to connect such chains to the cross head at two corresponding points in the lower stretches or runs of the chains. The studs are equi-distant from the axis of the vertical shaft 101. Movements of the attached links of the two chains in unison longitudinally of the head 21 of the main supporting carriage will cause the transfer carriage to be moved along its track without causing the vertical shaft 101 to turn in its bearing about its vertical axis. The invention provides, however, for relative longitudinal movements between the two chains 97 at times during the use of the device and the shaft 100 then will be turned angularly about its axis and will act through suitable connections which will later be described to cause a desirable angular adjustment or swinging movement of the tongs relative to the transfer arm.

The connection of the upper stretches or runs of the chains 97 with the framework of the head 21 is shown in a general way in Fig. 1 and in detail in Fig. 10. As best seen in the latter view, the head 21 has a cross plate 104 carrying a bracket 105 which is formed to provide a vertically disposed tubular bearing 106 at the center line of such head. A tubular shaft 107 is journaled in the bearing 106 and, at its lower portion, carries a cross head 108. The latter carries a pair of depending headed studs 109, the shanks of which extend through links of the upper stretches or runs of the chains 97 and pivotally connect them with the cross head. The studs 109 are located 180° apart around the axis of the tubular shaft 107 and are equi-distant horizontally from that axis.

With the connections as thus far described, a given longitudinal movement of the actuating carriage along its track in the head 21 will cause a movement of the transfer carriage and its supported transfer arm in the same direction but for a substantially greater distance. The distance ratio may be 2 for the transfer carriage to 1 for the actuating carriage. The reciprocatory movements of the actuating carriage along the head 21 are caused by the operations of driving mechanism which, as hereinbefore described, comprises the motor 61 on the base 20, Fig. 3, and the motion-transmitting parts which operatively connect that motor with the final drive pinion 52, Fig. 1, the latter being continuously in mesh with the teeth of the longitudinal rack bar 50 on the actuating carriage.

*The transfer arm traversing mechanism*

The shaft 68 of the drive mechanism on the base 20, Fig. 1, may carry a sprocket 75, Fig. 3. The sprocket 75 may be connected by an endless chain 76, Figs. 1 and 3, with a larger sprocket 77 on a horizontal shaft 78. The shaft 78 may be mounted in a suitable bearing 79 that is carried by an arm 80 having a hub portion 81 pivotally mounted on a portion of the shaft 68. The arm may be fastened by a suitable adjustable fastening device 82 to one of the uprights 22a of the column structure of the main oscillatory carriage of the device. This arrangement permits adjustment of the position of the shaft 78.

The shaft 78 carries a driven gear 83 in mesh with a gear or pinion 84 on a cam shaft 85. The cam shaft 85 is supported in bearings 86 on upstanding supporting brackets 87, Fig. 3. As best seen in Fig. 1 which shows one of these brackets in elevation, such bracket may be mounted on a supporting shaft 88 on the base 20. While the bracket members 87 normally are maintained in fixed relation with the base, they may be swung when desired about the axis of the supporting shaft 88 to the right as viewed in Fig. 1. This is to permit convenient removal of a barrel cam 89 that is carried by the cam shaft 85 and the replacement of such cam or the substitution therefor of a different cam. The cam 89 has a groove in its periphery comprising alternating straight dwell portions 90 and laterally turned or curved traverse portions 91, as best seen in Fig. 3. An upright stud 92, Figs. 1 and 3, carried by the stationary platform 25, projects through an arcuate slot 93, Fig. 3, in the base 20, and is provided at its upper end with a roller 94 working in the peripheral cam groove. Thus, when the cam 89 is rotated, its engagement with the fixed cam roller will cause the main carriage of the device to be oscillated on the platform 25 about the axis of the vertical shaft 28 in a series of steps, each of which results from relative movement between the cam roller and a laterally turned traverse portion 91 of the cam groove. When the cam roller is in engagement with a straight dwell portion of the cam groove, there will be no relative oscillatory movement between the main supporting carriage and its stationary platform. The arrangement may be such that for each complete cycle of reciprocation of the transfer arm 40, the main supporting carriage will have been turned one step in one direction and thus will swing the transfer arm laterally one step. This may occur during the outward stroke or in part during the outward stroke and in part during the inward stroke of the transfer arm.

The cam may be selected and its peripheral groove laid out to provide, within limits, any predetermined desirable number of lateral oscillatory steps of the main carriage and hence of the transfer arm during each complete cycle of rotation of the cam. During part of such cycle of rotation of the cam, the transfer arm may have been projected outward to a predetermined number of laterally spaced positions in turn while the lateral step-by-step movements of the transfer arm are in one direction, as from a position near one edge of a lehr conveyor, indicated at 95 in Figs. 1 and 2, to a position near the opposite edge. The return lateral swinging movements of the transfer arm during the remainder of the cycle of the cam may be attended by stops at the same laterally spaced positions or at other positions intermediate the first named positions. For simplicity of illustration, only three laterally spaced positions of the outwardly projected transfer arm are shown in Fig. 2. The particular structural arrangements above described for mounting the cam and certain of the components of the mechanism for driving such cam permit convenient change of cams for selection of a desired sequence of lateral steps by the transfer arm and also any change of components of the cam driving mechanism that may be required to maintain proper synchronization and co-ordination of the rectilinear reciprocatory and laterally oscillatory movements of the transfer arm.

Tongs and tongs operating mechanisms

Various specifically different forms of tongs may be used at different times with the transfer arm and other parts of the stacker. These may vary among themselves, particularly in their article gripping and releasing means, so as effectively to handle articles of different sizes, weights and shapes at different times. One such tongs is shown in Figs. 1 and 2 as applied to the transfer arm and as operatively connected with the tongs operated mechanism of the device. Details of this form of tongs are shown in Figs. 6 and 12 to 14, inclusive.

As shown in Figs. 1 and 6, the transfer arm 40 has its free or outer end portion formed to provide a vertically disposed hub or annular tongs holder 110. A vertical sleeve 111 is mounted within the hub 110 for rotary or turning movements about its own axis and also for vertical axial movements relative to the hub, as best seen in Fig 6. The sleeve 111 has a laterally enlarged integral head portion 112 overlying the upper end of the hub and adapted by its contact therewith to limit the downward movement of the sleeve 111 in the hub. The head 112 is provided with a pair of laterally spaced forwardly and upwardly projecting integral ears or lugs 113, Fig. 12. These are provided with aligned openings 114 through which a cross shaft 115 extends so that such shaft is supported in a horizontal position by the lugs. A pair of tong arms 116 have hub portions 117 at their rearward ends mounted loosely on the projecting ends of the cross shaft 115. The tong arms have a depending stop element, as indicated at 118, Fig. 1, on one or each of the hubs 117, for contacting with the adjacent edge of the head 112 to limit the downward swinging movements of the tong arms around the axis of the shaft 115 relative to the head 112.

The tong arms 116 carry the cooperative relatively movable article engaging tong members or jaws. In the example shown in Fig. 1, the outermost or more forwardly disposed of these article engaging members may comprise a cross rod 119 extending between and carried by the outer end portions of the arms 116. This rod may be covered by a layer of asbestos 120 or other suitable material for direct contact with a surface of the glass article to be handled by the device. The inner or rearward cooperative tong member or jaw may comprise a plate 121, Fig. 14, provided on its outer face with a partially imbedded marginal contact strip or layer of asbestos or other suitable material as indicated at 122. A light gauge metallic attaching plate 123 is located at the back of the plate 121 and is attached at its marginal portion, as at 124 to such plate. The central portion of the attaching plate 123 is connected, as by the headed stud 125 and the cotter pin 126 to an apertured ear 127 at the lower end of a short arm 128, Fig. 13, which is pivotally suspended from the tong arms 116. The arm 128 is part of a bell crank lever 128a on a cross shaft 129. The latter has its end portions journaled in suitable hubs 130, Figs. 12 and 13, with which the tong arms 116 are provided. The hubs 130 are located relatively adjacent to the hubs 117 at the rearward ends of the arms 116, although spaced therefrom.

The head of the stud 125, Fig. 14, may pivot on the central portion of the plate 121 of the rear tong member or jaw to the extent permitted by flexure of the attaching plate 123 under stress so as to permit limited universal movement between this jaw and its pivoted supporting arm 128. This is to assure close contact of the contact layer 122 of the rear jaw with the contiguous surface of the article that is being gripped. The attaching plate 123 may be formed of spring steel or other suitable material.

The bell crank lever 128a has a rearwardly extending actuating arm 131, Fig. 12, the rearward portion of which is formed to constitute a sector gear 132. The teeth of the gear 132 are constantly in mesh with the teeth of a cooperative sector gear 133 which is journaled on the cross shaft 115 intermediate the supporting lugs 113. The gear 133 is provided with a rearwardly extending actuating arm 134 having a pair of horizontally spaced forks 135 respectively disposed at opposite sides of the upper end portion of a vertical shaft 136, Figs. 12 and 6. Attaching pins or studs 137 are carried by the forks 135 so as to work in an annular groove 138 in the upper end portion of the vertical shaft 136. The arrangement is such as to provide a motion transmitting connection between the shaft 136 and the arm 134 for swinging the gear 133 vertically about the axis of the shaft 115.

The shaft 136 is mounted in the sleeve 111 for vertical axial movements relative to the sleeve and for rotary or turning movements about its own axis.

The shaft 136 depends below the lower ends of the sleeve 111 and of the hub 110 and is connected with a suitable mechanism, hereinafter described, for positively lifting and lowering the shaft 136 at the proper times in a cycle of operations of the stacking device.

A movement limiting pin 139 is carried by the rear jaw, supporting arm 128, Fig. 13. The ends of this pin project laterally of the opposite sides of the arm 128 sufficiently to strike the lower edges of the tong arms 116 to limit rearward and upward swinging movement of the arm 128 relative to the tong arms 116.

The means for raising and lowering the vertical shaft 136 comprises a bell crank lever 140, fulcrumed on a horizontal shaft 141 carried by a bracket 142 that depends from the outer end portion of the transfer arm 40, as shown in Fig. 1. The forwardly extending arm of this bell crank lever, indicated at 143, has forks 144 straddling the lower end portion of the shaft 136 and provided with inwardly extending pins or studs 145 projecting into an annular groove 146 in the lower end portion of the shaft 136. The arrangement is such as to effect a motion transmitting connection between the bell crank lever 140 and the shaft 136.

An upwardly extending arm 147 of the bell crank lever 140 is connected by an adjustable link or connecting rod 148 with a depending arm 149 of a bell crank lever 150 which has its hub journaled upon a cross shaft 151 that extends between and is carried by the side plates 36 of the transfer carriage. See Figs. 1 and 9. The bell crank lever 150 has an upwardly extending arm 152 pivotally attached by a cross pin 153 to a link of the lower run or stretch portion of an endless chain 154. This chain 154 is carried by sprockets 155 which respectively are loosely mounted on the forward and rear axles 42 and 43, respectively of the actuating carriage of the device. A link of the upper stretch or run of the endless chain 154 is pivotally connected by a headed stud 156 with a crank arm 157 on a vertical shaft 158 which is journaled in the sleeve 107, as best seen in Fig. 10. The upper end portion of the shaft 158 carries a crank arm 159 connected by suitable linkage, indicated at 160, with a piston rod 161 that protrudes from the forward end of an air motor 162. The air motor 162 is mounted on the bracket 105 on the head structure of the main carriage of the device, as shown in Fig. 1.

Each stroke of the piston of the air motor 162 will turn the shaft 158, Fig. 10, angularly about its axis and actuate the endless chain 154 so as to swing the bell crank lever 150 about its horizontal suporting shaft 151. From the bell crank lever 150, motion will be transmitted to the bell crank lever 140, which will be swung about its supporting shaft 141 so as either to raise or lower the shaft 136, according to the direction of movement of piston in the cylinder of the air motor 162. The operations of the air motor 162 are controlled so as to occur at the proper times in a complete cycle of operations of the stacking device. These are when the transfer arm is at rest at each of the opposite ends of its reciprocatory movements, as hereinafter will be explained. Movement of the chain 154 in consequence of the reciprocations of the actuating carriage will not cause raising or lowering of the shaft 136 as the lower stretch or run of the chain 154 and the transfer carriage and its arm will then be moving in unison.

The head 112, Fig. 6, is provided with a pair of upstanding attaching studs 163 which respectively are located equi-distant from the vertical axis of the rotary movement of the head supporting sleeve 111. These attaching studs are connected by chains or cables 164 with upstanding studs 165 on the oppositely extending arms of a cross bar 166 which is secured to the lower end portion of the vertical shaft 101, Fig. 11. The lower end portion of the shaft 101 may be formed to serve as an attaching post, indicated at 167 for a spring tensioned link or cable 168 which is attached at its forward end to the depending arm 169 of a bell crank lever 170, Fig. 1. The bell crank lever 170 is fulcrumed on a cross shaft 171, carried by a bracket on the forward end portion of the transfer arm 40. This bell crank lever has a forwardly extending arm 172 which presses at its extremity upon a flat contact surface 173 of the head 112. The spring tensioned cable 168 actuates the bell crank lever continuously so as to tend to urge the head 112 downward against the upper end of the supporting hub 110, Fig. 6, and yieldingly to resist upward movement of the sleeve 111 relative to the hub 110.

The shaft 101, Fig. 11, has a cross head at its top which is connected with the links of the lower stretch or run of the chains 97, as previously has been described herein. The upper stretches or runs of these same chains are attached, Fig. 10, to the arms of a cross head 108 on a sleeve or tubular shaft 107 which is journaled in a fixed part of the head structure of the main supporting carriage, as shown in Fig. 10, and also as previously described. This sleeve 107 has its upper end portion provided with an actuating member, specifically a sprocket 174, Fig. 10, connected by a chain 175, Fig. 2, with a sprocket 176 on the upper end of a vertical shaft 177.

The shaft 177 is supported on the base of the main supporting carriage of the stacking device. A sector gear 178, Figs. 2 and 3, is carried by the lower end portion of the shaft 177, beneath the base 20, in mesh with a fixed cooperative sector gear 179, Figs. 1, 2, and 3, which is mounted on the upstanding shaft 28 about which the main carriage may oscillate. Thus, oscillation of the main carriage about the vertical shaft 28 will cause turning movements of the vertical shaft 177 about its own axis. This in turn will transmit motion through the chain 175 and the sprocket 174 to the tubular shaft or sleeve 107, Fig. 10. The consequent turning of the sleeve 107 about its own axis will cause relative longitudinal movements between the chains 97. When this takes place, the tongs head member 112 will be turned about the vertical axis of its supporting sleeve in the hub 110 of the transfer arm 40. The tongs thus will be swung angularly relative to the transfer arm to an extent required to maintain such tongs continuously parallel with the direction of length of the lehr conveyor. The tongs are shown extending in a straight forward direction at the three positions of the transfer arm which respectively are shown in Fig. 2.

One the return movement of the transfer arm from each of its projected positions, the main carriage may or may not be oscillating relative to its base and hence the tongs may or may not be moved angularly relative to the transfer arm.

However, the tongs always assume the same position at the pick-up station as the vertical axis of angular turning movements of the tongs relative to the transfer arm will at that point coincide with the vertical axis of the vertical shaft 28 about which the oscillatory movements of the main carriage take place.

*Pneumatic control mechanism of the stacker*

Figure 4:
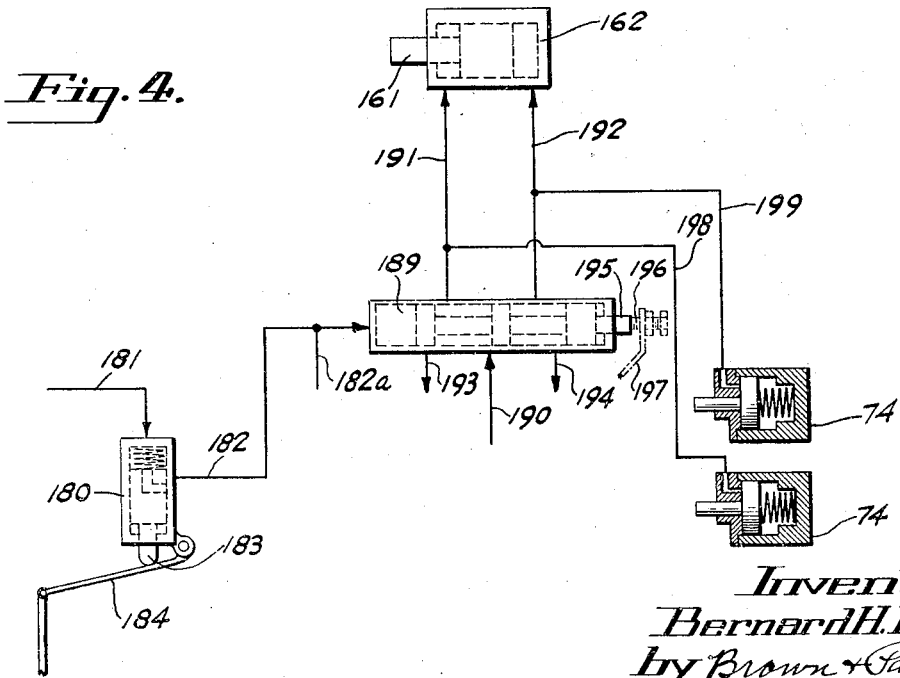
Fig. 4 is a diagram of the pneumatic devices and connections of the mechanism for controlling and timing cycles of article transferring movements of the stacking device.

The pneumatic control system is shown more or less diagrammatically in Fig. 4. This system includes a valve 180 which may be termed a starter valve. It may be supplied with air under pressure through a supply pipe 181 leading from or connected with any suitable source of supply of air or other pressure fluid. The valve 180 is provided with a delivery pipe 182 and with a movable externally projecting element 183 which is adapted to be actuated by a suitable movable actuator to open the valve 180 temporarily so that air will pass from the supply pipe 181 through the valve 180 to the pipe 182. Normally the valve 180 remains closed. It is unnecessary to describe the valve 180 further as it does not, per se, form part of the invention and may be of any suitable known construction.

The actuator may be a pivoted arm 184 which is supported adjacent to the starter valve 180, as at 185, Fig. 1. This pivoted arm has a contact piece 186, Fig. 2, located above a cross conveyor 187, Figs. 1 and 2, in position to be struck by an article 188 to be transferred when such article has been brought by the cross conveyor to the pick-up position. The resultant movement of the arm 184 will cause opening of the valve 180 temporarily, as above pointed out.

The pipe 182 is connected to one end of a two-way distributing valve 189, Figs. 1, 2 and 4. This valve is provided with an air supply line 190. It also is provided with a pair of delivery lines 191 and 192, respectively, leading to the opposite ends of the cylinder of the aforesaid air motor 162. These lines also constitute exhaust lines at suitable times and the valve 189 is provided with exhaust lines 193 and 194 respectively located at opposite sides of the supply line and in working relation with the lines 191 and 192. The two-way distributing valve 189 is adapted to be operated by air from the pipe 182 to open up a passage through such valve from the supply line 190 to the delivery line 191 leading to the forward end of the cylinder of the air motor 162. This will drive the piston of the air motor 162 rearwardly in its cylinder. Exhaust of air from the rearward end of the cylinder of the air motor 162 may take place through the pipe 192, part of the valve 189 and exhaust line 194. The air line 182 may be provided with a bleed line 182a.

The valve 189 also is provided with an externally projecting movable operating member 195 at its opposite end from the pipe 182. When the member 195 is forced inward, as by a movable actuator 196, carried by an upstanding arm 197 on the frame of the actuating carriage, Figs. 1 and 2, the valve 189 will be operated to establish communication through a portion thereof from the supply line 190 to the pipe 192 so as to drive the piston of the air motor 162 forwardly. At the same time, exhaust will take place from the forward end of the air motor 162 through the line 191 and the exhaust pipe 193. The valve actuator 196 is a screw-threaded member in threaded engagement with the arm 197 so that the time at which it will operate the operating valve member 195 of the valve 189 inwardly may be varied within the limits in a cycle of movements of the actuating carriage of the device.

The line 191 is connected by an air line 198 with the forward end of the lowermost of the trip cylinders 74 of the clutch mechanism with which the driving mechanism on the base of the main carriage is supplied. The line 192 is connected by an air line 199 with the forward end of the upper trip cylinder 74.

*Brief description of a typical operation of the stacking device*

A cycle of movements of the transfer arm may be assumed to start with the transfer arm in its retracted position at an article pick-up position over the cross conveyor 187 of Figs. 1 and 2. The pawl 69, Fig. 1, will be in its thrown-out position by reason of its contact with the plunger stop of the lower trip cylinder 74. The jaws of the tongs will be open with the tong arms in a raised, upwardly and forwardly inclined position. The head member 112 and the shaft 136, Fig. 6, will both be at the lower limits of their movements with relation to the hub 110. The rear pivotally supported tong member or jaw will be in a rearwardly and upwardly swung position with the ends of the stop pin 139, Fig. 13, raised against the bottom edges of the tong arms 116, Fig. 12. Arrival of the article 188, Figs. 1 and 2, at the pick-up station will cause opening of the valve 180, Fig. 4, as previously described. Operating air under pressure will be supplied to the forward end of the distributing valve 189 which will thus be operated to supply operating air to the forward end of the air motor 162, Figs. 1, 2 and 4, and to the lower trip cylinder 74, Fig. 1. This operation of the air motor 162 will cause motion to be imparted to the vertical shaft 136, Fig. 6, of the tongs mechanism through the connected motion transmitting parts, including the shaft 158, Fig. 10, the chain 154 of the actuating carriage, the bell crank lever 150, the connecting rod 148 and the bell crank lever 140, Fig. 1, to raise the shaft 136 in the hub 110 at the outer end of the transfer arm. As soon as upward movement of the shaft 136 commences, the tong arms 116, Fig. 12, will swing downward around the axis of the cross shaft 115 at opposite sides of the article to be picked up until the outer jaw 119—120 bears against the outer end surface of the article 188 or until stop 118 strikes the head 112. This will be accomplished without any relative movement between the gears 132 and 133 of the tongs. After the outer jaw has contacted the outer end wall of the article to be gripped, further upward movement of the shaft 136 will cause the enmeshed gears 132—133 to function to swing the rearward, pivotally supported tong member or jaw downwardly and outwardly against the adjacent end surface of the glass article 188. Such article will be gripped between these jaws before completion of the full upward movement of the shaft 136. The final upward movement of the shaft will cause lifting of the tongs as a unit and of the article that is in the grip of the tong jaws relative to the transfer arm, whereby to lift the article from the cross conveyor 187 or from any other surface that has been used to support the article at the pick-up station. Contact of the depending stop member or members 118 with the adjacent edge of the head member 112, Fig. 1, prevents relative movement between the tong arms and the shaft 136 during this latter part of the upward movement of the shaft.

By this time, the plunger stop of the lowermost trip cylinder 74 has been retracted, releasing the pawl 69 for engagement with the constantly rotating ratchet wheel 67. The lag in the time of retraction of the plunger stop in relation to the operation of the air motor 162 may be effected by restriction of the air passage leading to the front end of each of the trip cylinders 7. Through the operation of the transfer arm reciprocating means, substantially as hereinbefore described, the tongs and the article gripped thereby will be projected outward from the axis of oscillation of the main carriage of the device at substantially the level to which the article had been raised at the pick-up station. The position to which the tongs and the article will be thus moved may be varied on each outward stroke of the transfer arm by a lateral oscillatory movement of the transfer arm, by the means and in the manner previously described.

The transfer arm is shown in Fig. 1 in a projected position with the article gripped by the tongs above the conveyor 95. This may be a lehr conveyor, as aforesaid. At this time, the pawl 69 is held out of engagement with the ratchet wheel by the plunger stop of the upper trip cylinder 74, and the valve operating member 198, carried by the upper carriage, has just operated the distributing valve 189, Fig. 4, to effect a reversal of the air motor 162. It may be again noted that during the outward movement of the transfer arm, the tongs will have been given an angular turning movement in the manner and by the means hereinbefore described to keep them parallel with the direction of length of the lehr conveyor and to compensate for the angular turning movement of the transfer arm in the opposite direction.

On reversal of the air motor 162, the shaft 136 of the tongs mechanism will be moved downward from the position shown in Fig. 1 and in Fig. 6. The first consequence of this downward movement will be the lowering of the head 112 and of the tongs as a unit to lower the article 188 onto the lehr conveyor. The downward movement of the shaft 136 will next cause relative movement through the enmeshed gears of the tongs mechanism to swing the rearward pivotally supported jaw of the tongs rearwardly and upwardly until the stop pin 139 strikes the lower edges of the tong arms 116. Further downward movement of the shaft 136 will cause the tong arms to be raised about the axis of the cross shaft 115, thus swinging the forward jaw of the tongs upwardly and forwardly to clear the article 188. The tongs, with the jaws thereof open, will then be ready for engagement with the succeeding article at the pick-up station after the return stroke of the transfer arm has been effected.

The reversal of the air motor 162 will be followed by retraction of the plunger stop of the upper trip cylinder 74, such retraction having been caused by the operation of the distributing valve 189 in the manner previously described. This will permit the pawl 69 to engage the ratchet wheel of the driving mechanism for the succeeding half revolution of such ratchet wheel. In consequence, the transfer arm will be retracted to its pick-up position, ready for the next cycle of movements. The retractive movement of the transfer arm will be accomplished by the means and in the manner hereinbefore described.

*The tongs shown in Figs. 15 and 16*

The tongs shown in these views may be substituted for the tongs previously described. The same reference characters have been used to designate like parts of the specifically different forms of tongs.

In the tongs of the form shown in Figs. 15 and 16, the tong arms 216 have downwardly bent or inclined forward end portions. These tong arms are pivotally supported on the cross shaft 115, as in the case of the former tongs. They may be connected at their outer ends by a cross bar 216a. A bell crank lever 217 is carried by a cross shaft 218 extending between and supported by the tong arms 216. This bell crank lever has a depending arm 219 to which attaching shank 220 of the rearward jaw 221 is fastened, as by means of a cap bolt 222. The jaw 221 may comprise a rigid plate 221a covered on its front or contact face with a layer 223 of asbestos or other suitable material and backed by a light gauge attaching plate 221b of spring steel or other suitable material. This attaching plate is attached at its marginal portion to the face plate 221a, as by fastening elements 237, Fig. 15, and at its center by a headed stud 238. The arrangement is such that the jaw 221 is capable of limited universal spring resisted pivotal movements relative to its shank. As shown, the jaw 221 is substantially rectangular in configuration at its front or contact face but this obviously may be varied as desired or to meet different service requirements.

A rearwardly extending arm 224 of the bell crank 217 is provided with a sector gear portion 225 in mesh with the gear 133. The bell crank 217 also is provided with an upwardly extending arm 226 carrying a transversely extending stop pin 227 having projecting end portions for engaging with the upper edges of the arms 216 to limit the rearward and upward swinging movement of the jaw 221 from its article gripping position.

The cross shaft 218 is provided at its opposite ends with upwardly extending arms 229 to which links 229a are pivotally attached. These links are pivotally connected at their outer ends to projecting pins or trunnions 230 at the opposite ends of a movable cross head 231, portions of which are arranged for sliding movements in longitudinal slots 232 in the outer end portions of the tong arms 216. The intermediate portion of the cross head 231 may be flattened, as indicated at 233. A flat shank 234 of the front jaw 235 of the tongs is rigidly secured to this intermediate portion of the cross head 231, as by the fastening means 250. The shape and construction of the front jaw may be similar to those of the rear jaw 221.

With the construction described, relative movements between the enmeshed gears 225 and 133 will cause both jaws of the tongs to be moved in unison, either toward each other to grip an interposed article or away from each other to release such article. Other features of the operation of this particular form of tongs will be understood without specific mention thereof, this in view of the previously given description of the operation of the first form of tongs. The tongs just described are well adapted and may be preferred for use to effect the transfer of relatively large and heavy glass articles, such as large glass building blocks. Such tongs are of course not limited to this type of service.

*The tongs of Fig. 17*

In this form of tongs, the tong arms are designated 316. The rearward jaw 317 is carried by a relatively long depending arm 318 of a bell crank lever 319 which is supported on a cross shaft 320 that extends between and is carried by the tong arms. This bell crank lever has a rearwardly extending arm 321 provided with a gear sector 322 in mesh with the gear sector 133. A lever 323 is supported on a cross shaft 324 between the outer ends of the tong arms 316 and has a depending arm 325 carrying the forward or outer tong member or jaw 326. This lever also includes an upwardly extending arm 327 connected by a link 328 with the arm 318 by which the rearward jaw is carried. A stop pin 329 is carried by the arm 318 so that projecting end portions thereof will bear against the lower edges of the tong arms 316 when the arm 318 has been swung rearwardly a sufficient distance from the position shown in Fig. 17. The jaws may be constructed like those previously described for the tongs of Figs. 15 and 16.

The operations of the particular tongs mechanism of Fig. 17 will be understood without detailed explanation. It may be noted that this tongs is adapted to grip and release articles, such as that indicated at 330 in Fig. 17, which are of less height than the articles shown in certain of the preceding views. Thus, this tongs mechanism may be substituted for either of the tongs mechanisms previously described to transfer shorter articles than those previously transferred without any change in the level of the transfer arm being required.

What I claim is:

1. Apparatus for handling glass articles comprising a main carriage having a substantially rectangular head portion and mounted to oscillate about a vertical axis, a transfer arm supported by the substantially rectangular head structure of the main carriage for reciprocatory rectilinear movements relative to said head structure radially outward from and inward toward said vertical axis and for lateral movements with said head structure, means for causing intermittent oscillatory movements of said main carriage about said vertical axis, means for causing intermittent cycles of outward and inward reciprocatory movements of said transfer arm, tongs pivotally mounted on the outer end portion of said transfer arm for lateral swinging movements as a unit relative to said transfer arm about a vertical axis which is located in vertical alignment with the axis of oscillation of the main carriage when the transfer arm is at the end of its inward rectilinear movement relative to said main carriage, means for closing said tongs when the transfer arm is at the limit of one reciprocatory movement thereof and for opening the tongs when said transfer arm is at the limit of its reverse oscillatory movement thereof, and means for swinging said tongs angularly about the axis of their pivotal connection with said transfer arm on each lateral movement of the transfer arm with said main carriage in the opposite direction from that of the transfer arm about the axis of oscillation of the main carriage and to compensate for the lateral movement of the transfer arm.

2. Apparatus for handling glass articles comprising a main supporting carriage, including a head structure, a transfer arm, means for movably supporting said transfer arm at its inner end from said head structure for reciprocatory rectilinear movements relative to said head structure to move the outer end of the transfer arm between a glass article receiving station and a glass article delivery station, tongs carried by the transfer arm at its outer end, said tongs including relatively movable jaws, means for operating said tongs comprising an air motor comprising a cylinder mounted in a fixed position on the head structure of said main carriage and a piston reciprocable in said cylinder, and a system of motion transmitting elements operatively connecting said piston and the jaws of the tongs to effect closing of said jaws to grip an article at the receiving station when air under pressure is supplied to said cylinder at one end thereof to move the piston therein to the opposite end of the cylinder, and to open said jaws to release said article when it has been moved by the rectilinear movement of the transfer arm to said delivery station and air under pressure has been supplied to said opposite end of the cylinder to return the piston therein to its first named end, means for bringing each of the articles to be handled to said receiving station, means operable by each such article on its arrival at said receiving station to supply said air under pressure to said first named end of said cylinder, and means operable by said transfer arm on its arrival at the end of its outward stroke relative to said head structure to supply air under pressure to said opposite end of the cylinder.

3. Apparatus for handling glass articles comprising a main carriage, including a head structure, means providing an upper track and a lower track in said head structure, an actuating carriage mounted for movement along said upper track, a transfer carriage mounted for movement along said lower track, a transfer arm carried by said transfer carriage, tongs carried by the transfer arm at its outer end, means for moving said actuating carriage back and forth along said upper track, and distance increasing motion transmitting means connecting said actuating carriage with said transfer carriage for moving the latter along its track with the actuating carriage in the same direction but for a substantially greater distance.

4. Apparatus for handling glass articles comprising a main carriage, including a head structure, means providing an upper track and a lower track in said head structure, an actuating carriage mounted for movement along said upper track, a transfer carriage mounted for movement along said lower track, a transfer arm carried by said transfer carriage, tongs carried by the transfer arm at its outer end, means for moving said actuating carriage back and forth along said upper track, and means connecting the actuating carriage with the transfer carriage to cause movement of the latter along its track at a relatively increased speed when said actuating carriage is moved along its track.

5. Glass article handling apparatus comprising a main carriage mounted for oscillation about a vertical axis, a transfer arm, means for mounting said transfer arm at its inner end on said main carriage for reciprocatory rectilinear movements relative to the oscillatory carriage radially outward from and inward toward said vertical axis and for lateral oscillatory movements with said main carriage about said vertical axis, a tongs mechanism pivotally mounted on the outer end portion of the transfer arm for lateral swinging movements about a vertical axis relative to said transfer arm, and means for reciprocating said transfer arm relative to said main carriage to move said tongs mechanism from an article receiving station at which the axis of oscillation of the tongs mechanism relative to the transfer arm is vertically aligned with the axis of oscillation of the main carriage, and an article delivery station at which the tongs mechanism occupies different positions on successive outward movements of the transfer arm.

6. Glass article handing apparatus comprising a main carriage mounted for oscillation about a vertical axis, a transfer arm, means for mounting said transfer arm at its inner end on said main carriage for reciprocatory rectilinear movements relative to the oscillatory carriage and for oscillatory lateral movements with said main carriage, a tongs mechanism pivotally mounted on the outer end portion of the transfer arm for lateral swinging movements about a vertical axis relative to said transfer arm, means for oscillating said main carriage step-by-step about said vertical axis, means for reciprocating said transfer arm relative to said main carriage to move said tongs mechanism between an article receiving station at which the axis of oscillation of the tongs relative to the transfer arm is vertically aligned with the axis of oscillation of the main carriage and an article delivery station at which the position of the tongs mechanism is successively at a plurality of transversely spaced locations during each cycle of oscillation of the main carriage and means for swinging said tongs mechanism angularly about its axis of oscillation to maintain a constant relation between the tongs mechanism and a fixed straight line at all the different positions of said tongs mechanism.

7. Apparatus for handling glass articles comprising a main supporting structure, a transfer arm, means for mounting said transfer arm on said main supporting structure for rectilinear reciprocatory movements between horizontally spaced article receiving and article delivery stations, tongs carried by said transfer arm, means for reciprocating said transfer arm relative to said main supporting structure to move said tongs between said article receiving and article delivery stations, said tongs including a plurality of relatively movable article engaging members, an air motor mounted on said main supporting structure and a system of motion transmitting elements connecting said air motor operatively with said relatively movable article engaging members of said tongs positively to open and positively to close them.

8. In apparatus for handling glass articles, a movably mounted transfer arm having an outer end portion formed to constitute a vertical open ended annular holder, a sleeve mounted in said holder for limited vertical movements relative to the holder, said sleeve having a head at its upper end, a pair of spaced tong arms pivotally mounted at their inner ends on said head to swing vertically about a horizontal axis, means for limiting the downward swinging movement of said arms relative to said head, an outer jaw carried by said tong arms, and an inner jaw also carried by said tong arms, the inner jaw being pivotally suspended from said arms, means for limiting swinging movement of said inner jaw relative to said arms, a vertically movable shaft journaled in said sleeve, and motion transmitting means connecting said shaft and said inner jaw for causing a swinging movement of the inner jaw relative to said tong arms during a part only of each vertical movement of said shaft, and means for moving said shaft vertically relative to said annular holder.

9. Apparatus for handling glass articles comprising a supporting structure, means providing an upper track and a lower track in said supporting structure, an actuating carriage mounted for movement along one of said tracks, a transfer carriage mounted for movement along the other of said tracks, a transfer arm carried by said transfer carriage, tongs carried by the transfer arm at its outer end, means for moving said actuating carriage back and forth along its track, and distance increasing motion transmitting means connecting said actuating carriage with said transfer carriage for moving the latter along its track with the actuating carriage in the same direction but for a substantially greater distance.

10. Apparatus for handling glass articles comprising a supporting structure, means providing an upper track and a lower track in said supporting structure, an actuating carriage mounted for movement along one of said tracks, a transfer carriage mounted for movement along the other of said tracks, a transfer arm carried by said transfer carriage, tongs carried by the transfer arm at its outer end, means for moving said actuating carriage back and forth along its track, and means connecting the actuating carriage with the transfer carriage to cause movement of the latter along its track at a relatively increased speed when said actuating carriage is moved along its track.

11. In apparatus for handling glass articles, a movably mounted transfer arm having an outer end portion formed to constitute a vertical open-ended annular holder, a sleeve mounted in said holder for limited vertical movements relative to the holder, said sleeve having a head at its upper end, a tongs mechanism comprising a pair of co-operative jaws and means for mounting said jaws on said head for movements therewith and also for movements relative to each other to close and open them, a vertically movable shaft extending through said sleeve, means operatively connecting said shaft to said jaws to impart opening and closing movements to the latter on relative vertical movements between said shaft and said sleeve, means for moving said shaft vertically relative to said annular holder, and means for causing said sleeve to move vertically with said shaft during a part only of a complete vertical movement of the shaft relative to said holder.

12. In apparatus for handling glass articles, a movably mounted transfer arm having an outer end portion formed to constitute a vertical open-ended annular holder, a sleeve mounted in said holder for limited vertical movements relative to the holder, said sleeve having a head at its upper end, a tongs mechanism comprising a pair of co-operative jaws and means for mounting said jaws on said head for movements therewith and also for movements relative to each other to close and open them, a vertically movable shaft extending through said sleeve, means operatively connecting said shaft to said jaws to impart opening and closing movements to the latter on relative vertical movements between said shaft and said sleeve, an air motor located in a substantially fixed position, a system of motion transmitting elements operatively connecting said air motor to said vertically movable shaft to move the latter vertically relative to said annular holder when the air motor is operated, and means for causing said sleeve to move vertically with said shaft during a part only of a complete vertical movement of the shaft relative to said holder.

BERNARD H. KOOB.